(12) United States Patent
Gottschalk-Gaudig et al.

(10) Patent No.: US 8,333,946 B2
(45) Date of Patent: Dec. 18, 2012

(54) WATER-WETTABLE SILYLATED METAL OXIDES

(75) Inventors: Torsten Gottschalk-Gaudig, Burghausen (DE); Herbert Barthel, Emmerting (DE); Bernard Paul Binks, Walkington (GB); Henri Balard, Bruebach (FR)

(73) Assignee: Wacker Chemie AG, Munich (DE)

( * ) Notice: Subject to any disclaimer, the term of this patent is extended or adjusted under 35 U.S.C. 154(b) by 1635 days.

(21) Appl. No.: 10/738,543

(22) Filed: Dec. 17, 2003

(65) Prior Publication Data
US 2004/0131527 A1 Jul. 8, 2004

(30) Foreign Application Priority Data
Dec. 20, 2002 (DE) .................................. 102 60 323

(51) Int. Cl.
*C01B 33/12* (2006.01)
(52) U.S. Cl. .................................................... 423/335
(58) Field of Classification Search .................. 423/335
See application file for complete search history.

(56) References Cited

U.S. PATENT DOCUMENTS

| | | | |
|---|---|---|---|
| 5,278,204 A * | 1/1994 | Tojo et al. ...................... 523/212 |
| 5,573,189 A * | 11/1996 | Ward et al. ........................ 241/21 |
| 5,623,028 A * | 4/1997 | Fitzgerald et al. ............. 525/474 |
| 5,686,054 A * | 11/1997 | Barthel et al. ................. 423/335 |
| 5,851,715 A | 12/1998 | Barthel et al. |
| 6,191,122 B1 | 2/2001 | Lux et al. |
| 2003/0138715 A1 | 7/2003 | Barthel et al. |

FOREIGN PATENT DOCUMENTS

| | | |
|---|---|---|
| DE | 10 145 162 | 9/2003 |
| EP | 0 686 676 | 12/1995 |
| EP | 0 686 679 | 12/1995 |
| EP | 0 798 348 | 10/1997 |
| JP | 04298538 | * 10/1992 |
| JP | 04298538 A | * 10/1992 |
| WO | WO 01/12730 | 2/2001 |
| WO | WO 02/16267 | 2/2002 |

OTHER PUBLICATIONS

English Derwent Abstract corres. to EP 0 686 679 A1 [AN 1996-021902] [3].
English Derwent Abstract corres. to EP 0 686 676 A1 [AN 1996-021221] [03].
J. Schoelkopf et al., J. Colloid Inter J. Sci. 227, pp. 119-131 (2000).

* cited by examiner

*Primary Examiner* — Elena T Lightfoot
(74) *Attorney, Agent, or Firm* — Brooks Kushman P.C.

(57) ABSTRACT

Partly hydrophobic metal oxides are prepared by silylating a metal oxide with

I) an organosilane of the formula $R^1_n SiX_{4-n}$ 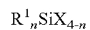

where n is 1, 2 or 3
or mixtures of these organosilanes,
$R^1$ each being an identical or different monovalent, optionally halogenated hydrocarbon radical having 1 to 24 carbon atoms, and being saturated, aromatic, monounsaturated, or polyunsaturation,
X being halogen, a nitrogen-containing radical, $OR^2$, $OCOR^2$, $O(CH_2)_xOR_2$,
$R^2$ being hydrogen or a monovalent hydrocarbon radical having 1 to 12 carbon atoms,
x being 1, 2 or 3;
or
II) an organosiloxane composed of units of the formula $(R^1_3 SiO_{1/2})$, and/or 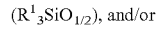

$(R^1_2 SiO_{2/2})$, and/or $(R^1SiO_{3/2})$, the number of $R^1$ units in one organosiloxane being at least 2; I and II used individually or in any desired mixture in a total amount of from 0.015 mmol/g to 0.15 mmol/g per 100 m²/g of metal oxide BET surface area.

13 Claims, 2 Drawing Sheets

WATER-WETTABLE SILYLATED METAL OXIDES

BACKGROUND OF THE INVENTION

1. Field of the Invention

The invention relates to a process for preparing partially hydrophobic metal oxide particles.

2. Background Art

Silylated silicas, as described for example in EP 0 686 676, are used routinely as rheological additives in nonaqueous polar resin systems. In water-based resins, however, their use is disadvantageous, since as a result of their pronounced hydrophobicity it is virtually impossible to incorporate them into the aqueous phase, and as a result of their strong propensity to depart the aqueous phase, tend toward flocculation and separation.

SUMMARY OF THE INVENTION

The invention was based on the object of providing a surface-modified solid that does not have the disadvantages of the prior art. This and other objects are achieved by hydrophobicizing metal oxide particles with a limited amount, from 0.015 mmol/g to 0.15 mmol/g of hydrophobicizing silane or organosiloxane per 100 m²/g of metal oxide surface area.

DETAILED DESCRIPTION OF THE PREFERRED EMBODIMENT(S)

Figure 1A:
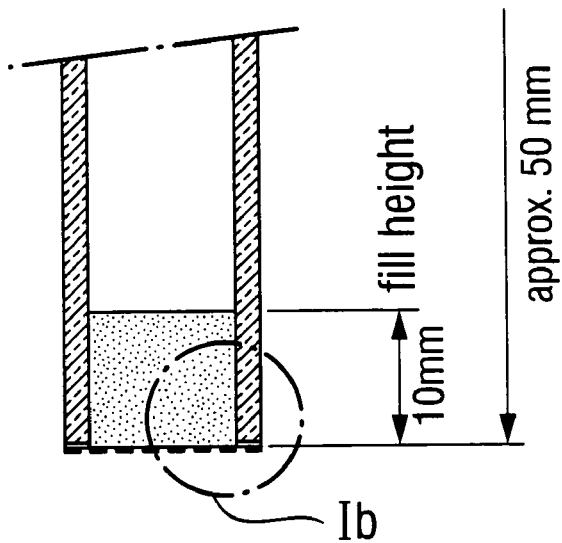
FIG. 1a-1b illustrates the method employed to measure contact angle of partially hydrophobicized metal oxide particles.

The invention provides a process for preparing partly hydrophobic metal oxide, which comprises silylating said metal oxide with I) an organosilane of the formula

where n is 1, 2 or 3
or mixtures of these organosilanes,
$R^1$ being a monovalent, optionally halogenated hydrocarbon radical having 1 to 24 carbon atoms being identical or different at each occurrence and which may be saturated, aromatic, monounsaturated, or polyunsaturated,
X being halogen, a nitrogen radical, $OR^2$, $OCOR^2$, $O(CH_2)_nOR^2$,
$R^2$ being hydrogen or a monovalent hydrocarbon radical having 1 to 12 carbon atoms, and
x being 1, 2 or 3;
or
II) an organosiloxane composed of units of the formula

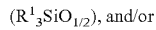

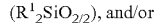

where $R^1$ is as defined above, or mixtures thereof,
the number of these units in one organosiloxane II) being at least 2; and I and II being used alone or in any desired mixtures in an amount of from 0.015 mmol/g to 0.15 mmol/g per 100 m²/g of metal oxide surface area used.

The metal oxide base product (starting product) used for the silylation preferably comprises metal oxides such as silica, either precipitated or fumed, titanium dioxide, aluminum dioxide, zirconium dioxide and their mixed oxides, which may have been prepared by wet methods, plasma methods or flame operation; preference is given to silicas (silicon dioxide), more preferably fumed silica, most preferably a silica prepared under anhydrous conditions. In one preferred embodiment the metal oxide is used in fluidized form.
Preparation of the Starting Silica Anhydrous means that no substantial amount of additional water, and preferably no additional water is supplied in either liquid or vapor form, in the hydrothermal production or in further steps such as cooling, purification and storage, up to and including the finished, purified, packaged and ready-to-dispatch product. In these operations the amount of water added is at most not more than 10% by weight, based on the total weight of the silica, preferably not more than 5% by weight, more preferably not more than 2.5% by weight, and with particular preference, no water at all is added.

It is preferred to use a silica having an increased surface activity, which can be described as increased surface homogeneity, and can be characterized as minimal surface roughness at the molecular level. The silica preferably has an average primary particle size of less than 100 nm, more preferably from 5 to 50 nm. These primary particles are present not in isolation in the silica, but instead are constituents of larger aggregates and agglomerates. The silica preferably has a specific surface area of from 25 to 500 m²/g, measured by the BET method in accordance with DIN 66131 and 66132.

The silica preferably comprises aggregates (as defined in DIN 53206) in a range of diameters from 100 to 1000 nm, the silica comprising agglomerates (as defined in DIN 53206) which are composed of aggregates and which as a function of the external shear load (e.g., measuring conditions) have sizes of from 1 to 500 μm.

The silica preferably has a fractal surface dimension of less than or equal to 2.3, more preferably less than or equal to 2.1, and most preferably from 1.95 to 2.05, the fractal dimension of the surface, $D_s$, being defined here as follows: particle surface area A is proportional to particle radius R to the power of $D_s$.

The silica preferably has a fractal mass dimension $D_m$ of preferably less than or equal to 2.8, more preferably less than or equal to 2.7, and most preferably 2.4 to 2.6. The fractal mass dimension $D_m$ is defined here as follows: particle mass M is proportional to particle radius R to the power of $D_m$.

The silica preferably has a density of available surface silanol groups, i.e., a density of silanol groups SiOH available for chemical reaction at the surface, of less than 2.5 SiOH/nm², preferably less than 2.1 SiOH/nm², more preferably less than 2 SiOH/nm², and most preferably from 1.7 to 1.9 SiOH/nm².

It is possible to use silicas prepared at a high temperature (more than 1000° C.). Particular preference is given to silicas prepared pyrogenically. It is possible to use hydrophilic silicas which come freshly prepared direct from the burner, have been stored, or have already been packaged in the commercially customary manner. Both uncompacted silicas, with bulk densities of less than 60 g/l, and compacted silicas, with bulk densities of more than 60 g/l, can be used. Mixtures of different silicas can be used: for example, mixtures of silicas differing in BET surface area.

The partly hydrophobic metal oxides, preferably silicas, are prepared in accordance with the inventive process, preferably employing pyrogenic metal oxides, by silylating the metal oxides, preferably in fluidized form, with I) an organosilane of the formula $$R^1{}_n SiX_{4-n}$$

where n is 1, 2 or 3
or mixtures of these organosilanes,
$R^1$ being a monovalent, optionally halogenated hydrocarbon radical having 1 to 24 carbon atoms and being identical or different at each occurrence, and being saturated, aromatic, monounsaturated, or polyunsaturated,
X being halogen, nitrogen radical, $OR^2$, $OCOR^2$, $O(CH_2)_xOR^2$,
$R^2$ being hydrogen or a monovalent hydrocarbon radical having 1 to 12 carbon atoms, and
x being 1, 2 or 3;
or
II) an organosiloxane composed of units of the formula $$(R^1{}_3SiO_{1/2}) \text{ and/or}$$

$$(R^1{}_2SiO_{2/2}), \text{ and/or}$$

$$(R^1{}_2SiO_{3/2})$$

where $R^1$ is as defined above, or mixtures thereof,
the number of these units in one organosiloxane being at least 2; and I and II being used alone or in any desired mixtures in an amount of from 0.015 mmol/g to 0.15 mmol/g per 100 $m^2$/g of metal oxide surface area used.

Examples of $R^1$ are alkyl radicals such as the methyl radical or the ethyl radical, propyl radicals such as the isopropyl or the n-propyl radical, butyl radicals such as the t-butyl or n-butyl radical, pentyl radicals such as the neopentyl, the isopentyl or the n-pentyl radicals, hexyl radicals such as the n-hexyl radical, heptyl radicals such as the n-heptyl radical, octyl radicals such as the 2-ethylhexyl radical or the n-octyl radical, decyl radicals such as the n-decyl radical, dodecyl radicals such as the n-dodecyl radical, hexadecyl radicals such as the n-hexadecyl radical, octadecyl radicals such as the n-octadecyl radical, alkenyl radicals such as the vinyl, the 2-allyl or the 5-hexenyl radicals, aryl radicals such as the phenyl, the biphenyl or naphthenyl radicals, alkylaryl radicals such as benzyl, ethylphenyl, tolyl or xylyl radicals, halogenated alkyl radicals such as the 3-chloropropyl, the 3,3,3-trifluoropropyl or the perfluorohexylethyl radical, and halogenated aryl radicals such as the chlorophenyl or chlorobenzyl radical. Preferred examples of $R^1$ are the methyl radical, the octyl radical and the vinyl radical, with the methyl radical being particularly preferred.

Examples of $R^2$ are alkyl radicals such as the methyl radical or ethyl radical, propyl radicals such as the isopropyl or the n-propyl radicals, butyl radicals such as the t-butyl or n-butyl radicals, pentyl radicals such as the neopentyl, the iso-pentyl or the n-pentyl radicals, hexyl radicals such as the n-hexyl radical, heptyl radicals such as the n-heptyl radical, octyl radicals such as the 2-ethylhexyl radical or the n-octyl radical, decyl radicals such as the n-decyl radical, and dodecyl radicals such as the n-dodecyl radical. Preferred examples of $R^2$ are the methyl and ethyl radicals.

Examples of organosilanes are methyltrichlorosilane, dimethyldichlorosilane, trimethylchlorosilane, methyltrimethoxysilane, dimethyldimethoxysilane, trimethylmethoxysilane, methyltriethoxysilane, dimethyldiethoxysilane, trimethylethoxysilane, methyltriacetoxysilane, dimethyldiacetoxysilane, trimethylacetoxysilane, octyldimethylchlorosilane, octyltrichlorosilane, octadecylmethyldichlorosilane, octadecyltrichlorosilane, vinyltrichlorosilane, vinylmethyldichlorosilane, vinyldimethylchlorosilane, vinyltrimethoxysilane, vinylmethyldimethoxysilane, vinyldimethylmethoxysilane, vinyltriethoxysilane, vinylmethyldiethoxysilane, vinyldimethylethoxysilane, hexamethyldisilazane, divinyltetramethyldisilazane, bis(3,3-trifluoropropyl)tetramethyldisilazane, octamethylcyclotetrasilazane and trimethylsilanol. Any desired mixtures of organosilanes can also be used. Mixtures of methyl-chlorosilanes on the one hand or alkoxysilanes and, if desired, disilazanes on the other hand are preferred. Preference is given to methyltrichlorosilane, dimethyldichlorosilane, trimethylchlorosilane, or hexamethyldisilazane.

Examples of organosiloxanes are linear or cyclic dialkylsiloxanes having an average number of dialkylsiloxy units of more than 3. The dialkylsiloxanes are preferably dimethylsiloxanes. Particular preference is given to linear polydimethylsiloxanes with the following end groups: trimethylsiloxy, dimethylhydroxysiloxy, dimethylchlorosiloxy, methyldichlorosiloxy, dimethylmethoxysiloxy, methyldimethoxysiloxy, dimethylethoxysiloxy, methyldiethoxysiloxy, dimethylacetoxysiloxy, methyldiacetoxysiloxy, dimethylhydroxysiloxy, it being possible for the end groups to be the same or different.

Among the specified polydimethylsiloxanes particular preference is given to those having a viscosity at 25° C. of from 2 to 100 mPas and having trimethylsiloxy or dimethylhydroxysiloxy end groups.

Further examples of organosiloxanes are liquid or soluble silicone resins, especially those containing methyl groups as the alkyl group. Particular preference is given to those containing $R^1{}_3SiO$ and $SiO_{4/2}$ units, or those containing $R^1SiO_{3/2}$ and, if desired, $R^1{}_2SiO_{2/2}$ units. In these formulae, $R^1$ is preferably methyl.

In the case of organosiloxanes having a viscosity of more than 1000 mPas preference is given to those which can be dissolved in a technically manageable solvent, preferably alcohols such as methanol, ethanol, or isopropanol, ethers such as diethyl ether or tetrahydrofuran, siloxanes such as hexamethyldisiloxane, alkanes such as cyclohexane or n-octane, or aromatics such as toluene or xylene, at a concentration of more than 10% and with a mixing viscosity of less than 1000 mPas at coating temperature. Mixtures of solvents can be used if desired.

For organosiloxanes which are solid at the coating temperature, preference is given to those which can be dissolved in a technically manageable solvent (as defined above) with a concentration of more than 10% by weight and a mixing viscosity of less than 1000 mPas at the coating temperature.

The organosilicon compounds described above are used as silylating agents for preparing the silylated silica.

Use is made preferably of between 0.015 mmol and 0.15 mmol, more preferably between 0.015 mmol and 0.09 mmol, and most preferably between 0.03 mmol and 0.09 mmol of silylating agent per 100 $m^2$/g metal oxide surface area used, preferably per 100 $m^2$/g BET silica surface area, measured by the BET method in accordance with DIN 66131 and 66132.

The silylation may be conducted as a discontinuous reaction, i.e., batchwise, or may be conducted as a continuous reaction. For technical reasons a continuous reaction is preferred. The reaction may be accomplished in one step, or in 2 or 3 successive steps. In other words, the reaction may be preceded by loading (physisorption of the silylating agent) and followed by a purification step. Preference is given to 3 successive steps: (1) loading, (2) reaction, and (3) purification.

The loading temperature is preferably from −30° C. to 350° C., more preferably from 20° C. to 300° C., and most preferably 20° C. to 120° C. The reaction temperatures preferably range from 50° C. to 400° C., more preferably from 50° C. to 350° C., and most preferably from 50° C. to 330° C. The reaction times are preferably from 1 min to 24 h, more preferably from 10 min to 8 h, and most preferably from 30 min to 4 h. The reaction pressure is preferably situated in the region of atmospheric pressure or an overpressure of up to 10 bar, with an underpressure (vacuum) up to 0.2 bar also being possible. The purification temperature preferably ranges from 100° C. to 400° C., more preferably from 250° C. to 350° C., and most preferably from 290° C. to 340° C.

Effective agitation and mixing of metal oxide, preferably silica, and silylating agent is necessary. Mixing thus preferably takes place by means of mechanical or gasborne fluidization. Gasborne fluidization may be effected by any inert gases which do not react with the silylating agent and the metal oxide, preferably silica, the silylated metal oxide, preferably silylated silica, and side-reaction products; in other words, which do not lead to side reactions, degradation reactions, oxidation events, and flame or explosion phenomena. Examples of inert gases include $N_2$, Ar, other noble gases, $CO_2$, etc. The fluidizing gases are preferably supplied at superficial gas velocities of from 0.05 to 5 cm/s, with particular preference, from 0.05 to 1 cm/s. Mechanical fluidization can be accomplished by means of paddle stirrers, anchor stirrers, and other suitable stirring elements.

In one particularly preferred version only the amount of gas sufficient to maintain a low-oxygen atmosphere is supplied, preferably less than 5% by volume being supplied, and fluidization is assisted by purely mechanical means.

The reaction is preferably conducted in an atmosphere which does not lead to oxidation of the silylated metal oxide, preferably the silylated Silica, i.e., a low-oxygen atmosphere, preferably less than 10% by volume oxygen, with particular preference less than 2.5% by volume, best results being achieved at less than 1% by volume oxygen.

The silylating agents are introduced effectively into the metal oxide, preferably the Silica. Since the silylating agents are compounds which are generally liquid at room temperature and/or at reaction temperature it is preferred to employ effective atomizing techniques: atomization in 1-fluid nozzles under pressure (from 5 to 20 bar), spraying in 2-fluid nozzles under pressure (gas and liquid, 2-20 bar), ultrafine division with atomizers, etc.

The silylating agent is preferably added in the form of a very finely divided aerosol, characterized in that the aerosol has a settling velocity of preferably 0.1-20 cm/s and a droplet size with an aerodynamic equivalent diameter of from 5 μm to 25 μm.

Optionally it is possible to add solvents, preferably protic solvents such as liquid or vaporizable alcohols or water. Typical alcohols are isopropanol, ethanol, and methanol. It is also possible to add mixtures of the above-mentioned protic solvents. Preferably no protic solvents are added.

Optionally it is possible to add catalysts, preferably acidic or basic catalysts. These catalysts may be basic in nature in the sense of a Lewis base or a Brönsted base such as ammonia, or acidic in nature in the sense of a Lewis acid or a Brönsted acid such as hydrogen chloride. They are preferably added in traces, which means less than 1000 ppm. It is particularly preferred not to add any catalysts.

The purification step is characterized by agitation, with preference being given to slow agitation and slight mixing. The purification step is further characterized by an increased gas input, corresponding to a superficial gas velocity of from 0.001 to 10 cm/s, preferably from 0.01 to 1 cm/s.

Additionally the purification step may involve mixing with mechanical stirring elements. The stirring elements are preferably arranged and agitated in such a way that mixing and fluidization occur, but not complete vortexes.

In addition, it is possible during the silylating step to employ methods for mechanical compaction, such as, for example, press rollers, ball mills, edge runner mills, screw compactors, briquetting machines, and the like.

It is further possible during the silylating step to employ processes for deagglomeration of metal oxides, preferably silica, such as pinned-disk mills or milling/classifying devices.

It is possible following the purification processes, to employ processses for mechanical compaction of the silica such as press rollers, or compaction by withdrawal of the air or gas present under suction by means of suitable vacuum methods, or other processes for mechanical compaction, for example, press rollers, ball mills, edge runner mills, screw compactors, or briquetting machines. It is further possible for any purification to be followed by processes for deagglomeration of the metal oxides, preferably silica, such as pinned-disk mills or milling/classifying devices.

In one preferred version the unreacted silylating agents, side-reaction products, silylating agent excesses, etc., which have not been chemically fixed and which may have been modified, waste products of purification, and waste gases from the purification step, are passed back into the step of coating and loading of the metal oxide in suitably temperature-conditioned devices. This may be done in whole or in part, preferably to the extent of 50-90% of the overall volume flow of the gas volumes emerging from the purification.

The invention provides a partly hydrophobic silica whose particles preferably have a contact angle θ of less than 180° in air for water, the degree of coverage τ of the surface of the silica with silylating agent residues, based on the total silica particle surface area, being 1%<τ<50%, the density of the surface silanol groups SiOH ranging preferably between a minimum of 0.9 and a maximum of 1.7, more preferably 1.0 to 1.7, and most preferably 1.2 to 1.7 SiOH per $nm^2$ particle surface, and the particles preferably having a carbon content of less than 0.1 to 2.0%, more preferably 0.1 to 1.6%, most preferably 0.1 to 1.4% by weight for a specific surface area of 100 $m^2/g$, and preferably a methanol number of less than 30, more preferably less than 20. In particularly preferred embodiments, silica preferably has a carbon content for a specific surface area of 100 $m^2/g$ of 0.1 to 0.8, more preferably 0.1 to 0.67%, and most preferably 0.1 to 0.5%.

The silica of the invention is characterized in that on contact with water it is substantially completely wettable, e.g. when shaken into water, the silica sinks and the fraction which floats on the surface of the water is preferably less than 30% by weight, more preferably less than 5% by weight, and most preferably less than 1% by weight.

The particles are preferably characterized in that with respect to water they do not exhibit complete unwettability; i.e., that they have a contact angle θ in air for water of less than 180°. The contact angle θ of the particles for water is preferably between 100° and 0°, and most preferably between 90° and 0°. For the metal oxide particles of the invention, such contact angles indicate that the metal oxides are partly hydrophobicized, preferably partly silylated. In accordance with the invention, "partly silylated" means that neither the entire metal oxide surface is unsilylated nor that the entire metal oxide surface is silylated.

The degree of coverage τ of the surface with silylating agent residues, based on the total metal oxide particle surface area, is 1%<τ<50%, preferably 1%<τ<30%, and most preferably 10%<τ<30%. The coverage with silylating agent can be determined, for example, by means of elemental analysis, such as via the carbon content, or by determining the residual reactive surface OH group content of the metal oxide.

For pyrogenic silica, partial silylation means that the amount of nonsilylated surface silanol groups on the silica surface ranges between at least 50% and not more than 95% of those initially present on the silica. The initial silica (100% by weight) generally contains 1.5 to 2.5 SiOH/nm² specific surface area, preferably 1.6 to 2.0 SiOH/nm².

Under these conditions, the density of the surface silanol groups, SiOH, preferably ranges between a minimum of 0.9 and a maximum of 1.7, more preferably 1.0 to 1.7, most preferably 1.2 to 1.7 SiOH/nm² particle surface area. For a silica with a specific surface area of 200 m²/g which is employed for silylation this translates to 0.3 mmol/g SiOH to 0.57 mmol/SiOH; for a silica with lesser or greater surface area this means, in linear proportion, a greater or lesser number of surface silanol groups SiOH.

Complete water wetting of pyrogenic silica occurs when the silica has a carbon content of less than 0.1% by weight for a specific surface area of 100 m²/g. For a silica with lesser or greater surface area this means, in linear proportion, a greater or lesser carbon content. Preference is given to pyrogenic silica which is not completely water-wettable and which has a carbon content of preferably more than 0.1% by weight for a specific surface area of 100 m²/g. For a silica with lesser or greater surface area this means, in linear proportion, a greater or lesser carbon content.

Preference is given to pyrogenic silica which is not completely water-unwettable and which has a carbon content of less than 1% by weight for a specific surface area of 100 m²/g. For a silica with lesser or greater surface area this means, in linear proportion, a greater or lesser carbon content. Pyrogenic silica which is not completely water-unwettable preferably has a methanol number of less than 30.

Contact angles on powders may be measured by standard methods:

1) The contact angle of the particles can be obtained by carefully preparing, by customary methods, a compact of the pulverulent solid consisting of particles, and subsequently determining the contact angle for a known, defined liquid, preferably a pure substance of known surface tension in air, using conventional methods, e.g., goniometers, or by digital image evaluation.

The contact angle θ defines the ratio of the surface tensions and surface energies γ of liquids (l) and solids (s) in a gas space (g) as follows:

$$\cos(\theta) = (\gamma(sl) - \gamma(sg))/\gamma(lg)$$

The surface energy (mJ/m²) of a solid has the same dimensions as the surface tension of a liquid (mN/m), since [J]=[N*m].

2) The contact angle can be ascertained by imbibition methods using the Lucas-Washburn equation. This is based on the imbibition of a known, defined liquid, preferably a pure substance of known surface tension, into a defined cluster, or into a gently compressed compact, or an adhesive tape coated with the particles, having an open porosity and pore radius r, preferably a porosity of more than 0.25, for the particle cluster. The rate of imbibition, dh/dt, or the height of the imbibed liquid column, h, calculated from the mass increase m in liquid by the particle cluster over the time t, the viscosity of the imbibed liquid η, and the surface tension γ of the imbibed liquid, can be used with known particle radius r to determine the cosine of θ (cos(θ)) and thus the contact angle θ of the liquid against the particle surface, by means of the Lucas-Washburn equation (Washburn, E. W., Phys. Rev. 17, 273 (1921) and R. Lucas, Kolloid Z. 23, 15 (1918)):

$$dh/dt = r^* \gamma^* \cos(\theta)/(4^* \eta)$$

or $$h^2 = r^* \gamma^* t^* \cos(\theta)/(2^* \eta)$$

Further details relating to the description of the method are given in J. Schoelkopf et al, J. Colloid. Interf. Sci. 227, 119-131 (2000):

$t = A \cdot m^2$ Washburn equation where t: time m: mass of the imbibed liquid $$A = \frac{\eta}{\{C \cdot \rho^2 \cdot \gamma \cdot \cos \vartheta\}}$$

η: viscosity of the liquid

ρ: density of the liquid

γ: surface tension of the liquid

ϑ: liquid/powder contact angle

C: factor dependent on the geometric properties of the powder and sample tube

Figure 1B:
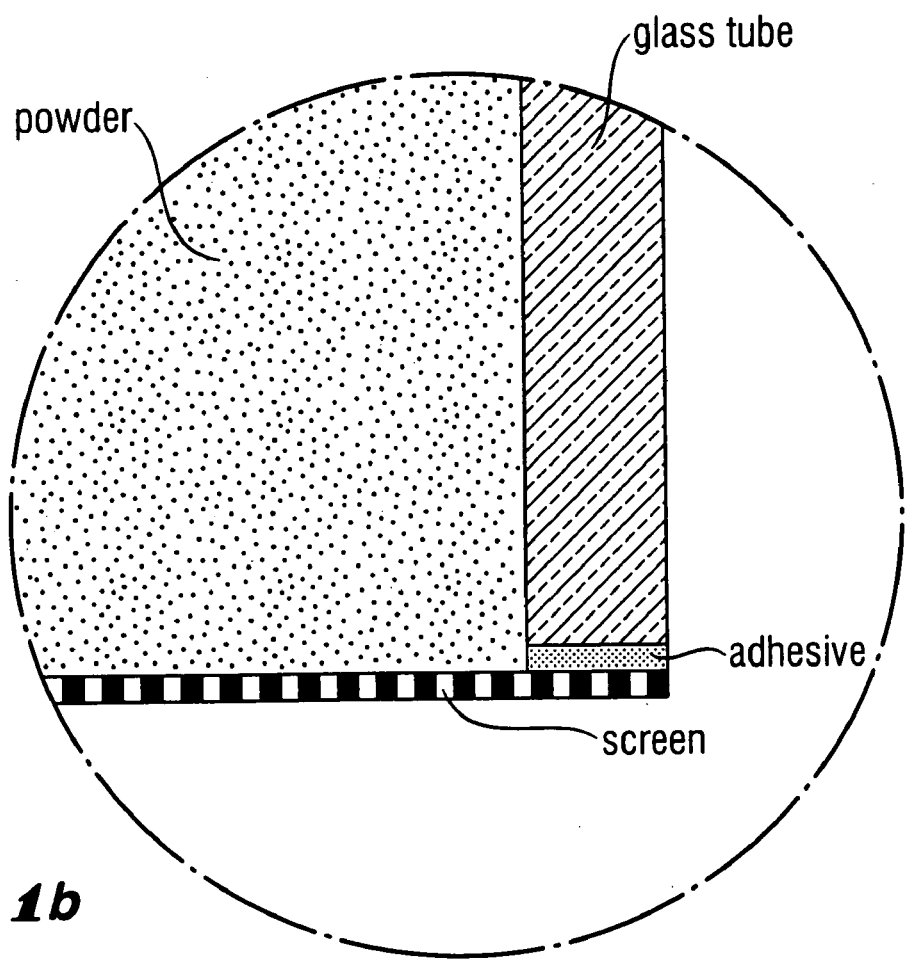

An illustration of the measurement method is given in FIG. 1.

The surface energy of particles may also be determined by standard methods:

3) Repetition of the experiment under 1) or 2) with different liquids having different surface tensions.

3a) Plotting of the cosine of the contact angle θ ascertained in a Zisman plot against the surface tension γ of the liquid used, cos(θ)=f(γ), gives, as the intersection with the abscissa, the critical surface energy $\gamma_{crit}$ as a measure of the surface energy γ of the particles.

Figure 2:
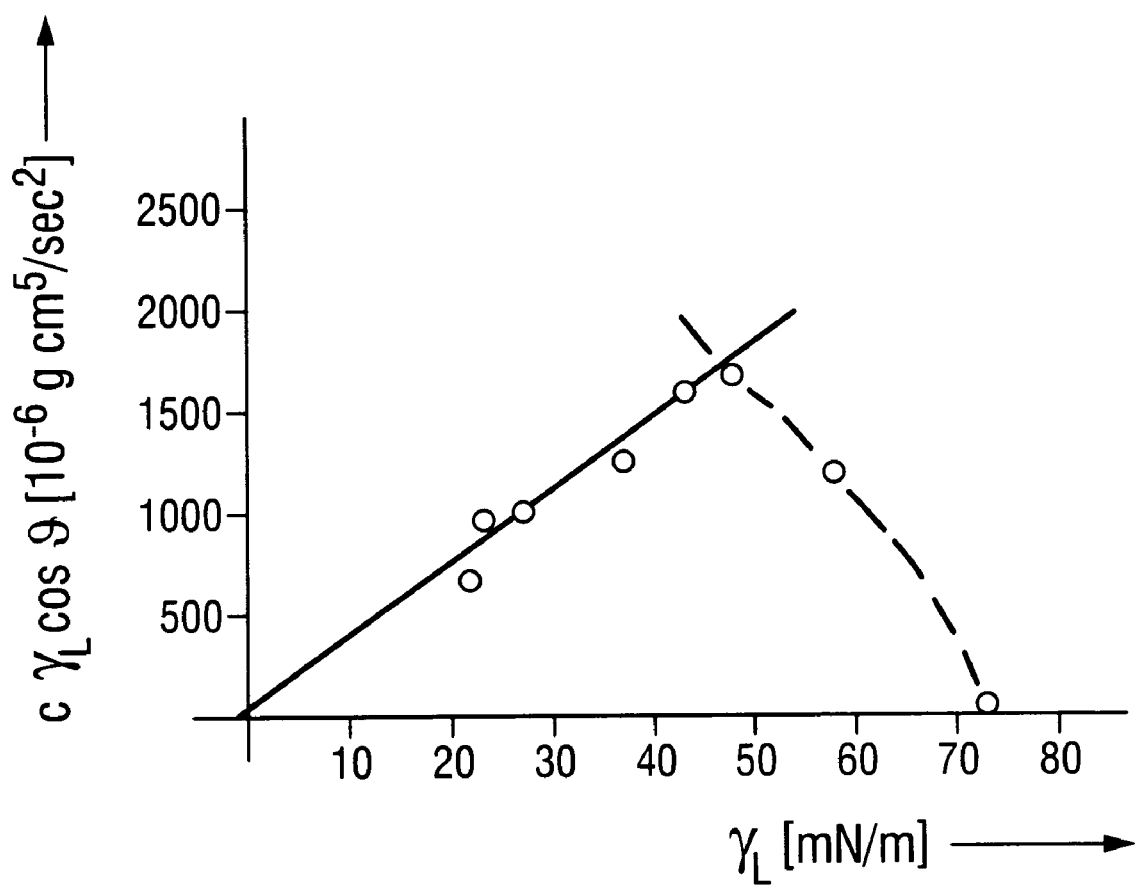
FIG. 2 illustrates a graphical method to determine critical surface energy.

3b) Plotting of the imbibition parameter A in a Zisman plot against the surface tension γ of the liquid used produces, at the peak of the curve (maximum), as the associated abscissa value, the critical surface energy $\gamma_{crit}$ as a measure of the surface energy γ of the particles. (See diagram, FIG. 2).

4) For particles which form agglomerates with bulk densities $d_{SD} \ll 1$ g/ml but consisting of primary particles with material densities $d_{MD} > 1$ g/ml, the particles can be shaken into liquids of different surface tension. Employing the latter as a method, in the event of nonwetting, the particle agglomerates float; in the event of wetting, the air in the agglomerates is displaced and the particle agglomerates sink. If different liquids of different surface tension are used it is possible to determine exactly the surface tension of a liquid at which the particle agglomerates sink; this gives the critical surface energy $\gamma_{crit}$ as a measure of the surface energy γ of the particles. The method can also be simplified by reducing the surface tension of water (72.5 mN/m) by adding methanol, ethanol or isopropanol.

4a) Typically, water is then introduced, a defined amount of particle agglomerates are placed on the surface of the water (floating) and then the alcohol is slowly added with stirring. The water-to-alcohol ratio when the particle agglomerates sink is recorded and the surface tension is determined precisely for this water:alcohol ratio in a separate experiment using standard methods, e.g. the ring detachment method, Wilhelmy method.

4b) In another version it is also possible to prepare defined mixtures of water with the abovementioned lower alcohols and then to determine the surface tensions of these mixtures. In a separate experiment these water:alcohol mixtures are overlayered with defined amounts of particle agglomerates, in a volume ratio of 1:1, for example, and shaken under defined conditions (for example, gentle shaking by hand or using a tumble mixer for about 1 minute). A determination is made of the water:alcohol mixture in which the particle agglomerates still just do not sink and of the water:alcohol mixture with a higher alcohol content in which the particle agglomerates do just sink. The surface tension of the latter alcohol: water mixture gives the critical surface energy $\gamma_{crit}$ as a measure of the surface energy $\gamma$ of the particles.

Methanol number: If the alcohol used is methanol, the methanol content in water gives the methanol number.

The surface-modified silica is further characterized in that it has a high thickening effect in aqueous systems, such as solutions, suspensions, emulsions and dispersions of organic resins in aqueous systems, e.g.: polyesters, vinyl esters, epoxyies, polyurethanes, alkyd resins, etc., and thus is suitable as a rheological additive in such systems.

The invention therefore generally provides for the use of the silica in aqueous systems as a vicosity-imparting component. This relates to all water-thinnable film-forming coating materials, rubberlike to hard coatings, adhesives, sealing compounds, casting compounds, and other, comparable systems.

Also provided is an emulsion comprising a silica or metal oxide of the invention, preferably a silica, prepared by the process of the invention.

The surface-modified metal oxide, preferably the surface-modified silica, is further characterized in that it can be used to stabilize emulsions in the sense of solids-stabilized emulsions. Both water-in-oil (w/o) and oil-in-water (o/w) emulsions can be stabilized. In addition to silica, the emulsions may include further organic or inorganic emulsifiers, but preferably contain no emulsifiers other than the silica of the invention. The amount of the inventive silica in the emulsions is generally less than 20%, preferably less than 10%, more preferably less than 5% by weight.

Also provided by the invention are a toner and an additive for controlling the rheology of liquid and pulverulent systems which comprise a metal oxide of the invention, preferably a silica of the invention, or a metal oxide, preferably a silica, prepared by the process of the invention.

The surface-modified metal oxide, preferably a silica, is further characterized in that in pulverulent systems it prevents caking or clumping, for example under the effects of moisture, but also shows no tendency toward reagglomeration, and hence to unwanted separation, but instead keeps powders free-flowing and so allows mixtures which are stable to loading and stable on storage. This applies in particular to use in nonmagnetic and magnetic toners and developers and charge control assistants, e.g., in contactless or electrophotographic printing/reproduction processes, which can be 1-component and 2-component systems. This also applies to pulverulent resins which are used as coating systems.

The surface-modified metal oxide, preferably a silica, is further characterized in that the silica can be used for rheological control in solvent-based and solvent-free, nonaqueous systems, such as epoxy systems, polyurethane systems (PU), vinyl ester resins, unsaturated polyester resins, solvent-free resins which are applied in powder form, e.g., as coating materials. The binders here are generally characterized in that they comprise apolar resins, i.e., resins containing only a small number if any, of functional groups capable of interaction with the surface of the silica, such as carbonyl, ester or OH groups, for example. When used as a rheological additive in these systems, the metal oxide, preferably silica, provides the required viscosity, pseudoplasticity, thixotropy, and a yield point which is sufficient to enable it to stay on vertical surfaces.

EXAMPLES

Preparation and Characterization of Partly Hydrophobicized Silicas.

Example 1

At a temperature of 25° C. and under $N_2$ inert gas, 100 g of hydrophilic silica with a moisture content of less than 1%, an HCl content of less than 100 ppm, and with a specific surface area of 200 $m^2/g$ (measured by the BET method in accordance with DIN 66131 and 66132 available under the name WACKER HDK N20 from Wacker-Chemie GmbH, Munich, Germany, are admixed by atomization through a one-fluid nozzle (pressure: 5 bar) with 1.70 g of a mixture of 0.37 g of $H_2O$ and 1.33 g of MeOH and 2.86 g of dimethyldichlorosilane. The silica thus loaded is reacted at 250° C. in a 100 l drying cabinet under $N_2$ for a residence time of 2 hours.

The analytical data are listed in Table 1.

Example 2

In a continuous apparatus at a temperature of 30° C. and under $N_2$ inert gas, a mass flow of 1500 g/h of hydrophilic silica with a moisture content of less than 1%, an HCl content of less than 100 ppm, and with a specific surface area of 300 $m^2/g$ measured by the BET method in accordance with DIN 66131 and 66132, available under the name WACKER HDK T30 from Wacker-Chemie GmbH, Munich, Germany, is admixed through a nozzle with 20 g/h of DI (DI=deionized, i.e., fully demineralized) water in very finely divided form and with 40 g/h of hexamethyldisilazane, in liquid, finely divided form, by atomization through a one-fluid nozzle (pressure: 10 bar). The silica thus loaded is reacted at a temperature of 80° C. for a residence time of 4 hours during which it is further fluidized by stirring, and then is purified in a dryer at 150° C. with a residence time of 2 hours. This gives a hydrophobic white silica powder with a homogeneous coat of silylating agent.

The analytical data are listed in Table 1.

Example 3

In a continuous apparatus at a temperature of 30° C. and under $N_2$ inert gas a mass flow of 1500 g/h of hydrophilic silica with a moisture content of less than 1%, an HCl content of less than 100 ppm, and with a specific surface area of 150 $m^2/g$ measured by the BET method in accordance with DIN 66131 and 66132, available under the name WACKER HDK V15 from Wacker-Chemie GmbH, Munich, Germany, is admixed through a nozzle with 10 g/h of DI water in very finely divided form and with 20 g/h of hexamethyldisilazane, in liquid, finely divided form, by atomization through a one-fluid nozzle (pressure: 10 bar). The silica thus loaded is reacted at a temperature of 80° C. for a residence time of 4 hours during which it is further fluidized by stirring, and then is purified in a dryer at 150° C. with a residence time of 2 hours. This gives a hydrophobic white silica powder with a homogeneous coat of silylating agent.

The analytical data are listed in Table 1.

Example 4

In a continuous apparatus at a temperature of 30° C. and under $N_2$ inert gas, a mass flow of 1000 g/h of hydrophilic silica with a moisture content of less than 1% an HCl content of less than 100 ppm, and with a specific surface area of 200 m$^2$/g measured by the BET method in accordance with DIN 66131 and 66132, available under the name WACKER HDK N20 from Wacker-Chemie GmbH, Munich, Germany, is admixed through a nozzle with 10 g/h of an OH-terminal polydimethylsiloxane having a viscosity at 25° C. of 40 mPas and an OH content of 4% by weight, in liquid, finely divided form, by atomization through a one-fluid nozzle (pressure: 10 bar). The silica thus loaded is reacted at a temperature of 300° C. for a residence time of 4 hours during which it is further fluidized by stirring, and then is purified in a dryer at 150° C. with a residence time of 2 hours. This gives a hydrophobic white silica powder with a homogeneous coat of silylating agent.

The analytical data are listed in Table 1.

Example 5

At a temperature of 25° C. and under N$_2$ inert gas, 100 g of hydrophilic silica with a moisture content of less than 1% an HCl content of less than 100 ppm, and with a specific surface area of 200 m$^2$/g measured by the BET method in accordance with DIN 66131 and 66132, available under the name WACKER HDK N20 from Wacker-Chemie GmbH, Munich, Germany are admixed by atomization through a one-fluid nozzle (pressure: 5 bar) with 2.00 g of an OH-terminal polydimethylsiloxane having a viscosity at 25° C. of 40 mPas and an OH content of 4% by weight. The silica thus loaded is reacted at 300° C. in a 100 l drying cabinet under N$_2$ for a residence time of 3 hours.

The analytical data are listed in Table 1.

TABLE 1

Analytical data of the Silica of Examples 1 to 5

| Example | % C | % SiOH radicals | BET Surface Area (m$^2$/g) | Water Wettability | Methanol Number | θ water, degrees |
|---|---|---|---|---|---|---|
| 1 | 0.56 | 80 | 184 | Yes | 0 | 84.1 |
| 2 | 0.95 | 82 | 234 | Yes | 5 | 90.3 |
| 3 | 0.41 | 74 | 112 | Yes | 15 | 92.4 |
| 4 | 0.35 | 94 | 182 | Yes | 0 | 88.7 |
| 5 | 0.61 | 84 | 169 | Yes | 0 | 100.3 |

Description of the Analytical Methods:

1. Carbon content (% C)

Elemental analysis for carbon; combustion of the sample at above 1000° C. in a stream of O$_2$, detection and quantification of the resultant CO$_2$ by IR; instrument: LECO 244

2. Residual nonsilylated silica silanol group content

Method: acid-base titration of the silica suspended in water/methanol=50:50; titration in the region above the pH range of the isoelectric point and below the pH range of dissolution of the silica; untreated silica with 100% SiOH (silica surface silanol groups): SiOH-phil=2 SiOH/nm$^2$; silylated silica: SiOH-silyl; residual silica silanol content: % SiOH=SiOH-silyl/SiOH-phil*100% (by analogy with G. W. Sears, ANAL. CHEM, 28 (12), (1950), 1981)

3. Test (yes/no) of water wettability: an equal volume of silica is shaken with the same volume of water; in the case of wetting (hydrophilic) silica sinks: YES; in the case of nonwetting (hydrophobic) silica floats: NO;

4. Test (volume % MeOH in water) of wettability with water/methanol mixtures=methanol number (MN): an equal volume of the silica is shaken with the same volume of water/methanol mixture; start with 0% methanol; in the event of no wetting silica floats: a mixture with an MeOH content higher by 5% by volume should be used; in the event of wetting silica sinks: fraction of MeOH (%) in water gives MN (methanol number).

Preparation and Characterization of Silica-Stabilized Emulsions:

Example 6

Preparation of a Silica Dispersion 10 ml of a 0.01 molar solution of NaCl in DI water were admixed with 2% by weight of a silica from Example 1 and treated with an ultrasonication tip (10 W, 40 kHz) for 5 minutes with ice cooling.

Preparation of the Emulsion:

5 ml of the above-described aqueous dispersion were admixed with 5 ml of toluene and homogenized using an Ultra-Turrax (IKA Labortechnik) at 3000 rpm for 2 minutes. A stable emulsion was formed.

The analytical data of the emulsion are summarized in Table 2.

Example 7

5 ml of the aqueous dispersion described in Example 6 were admixed with 5 ml of a trimethylsilyl-terminated polydimethylsiloxane with a viscosity η=1000 mPas, available under the name AK 1000 from Wacker-Chemie GmbH, Burghausen, Germany, and homogenized using an Ultra-Turrax (IKA Labortechnik) at 3000 rpm for 2 minutes. A stable emulsion was formed.

The analytical data of the emulsion are summarized in Table 2.

Example 8

5 ml of the aqueous dispersion described in Example 6 were admixed with ml of an OH-terminated polydimethylsiloxane with a viscosity η=1000 mPas available under the name OH-Polymer 1000 from Wacker-Chemie GmbH, Burghausen, Germany, and homogenized using an Ultra-Turrax (IKA Labortechnik) at 3000 rpm for 2 minutes. A stable emulsion was formed.

The analytical data of the emulsion are summarized in Table 2.

Example 9

3 ml of an aqueous dispersion as described in Example 6 of a silica from Example 3 were admixed with 7 ml of an OH-terminated polydimethylsiloxane with a viscosity η=1000 mPas (available under the name OH-Polymer 1000 from Wacker-Chemie GmbH, Burghausen, D) and homogenized using an Ultra-Turrax (IKA Labortechnik) at 3000 rpm for 2 minutes. A stable emulsion was formed. The analytical data of the emulsion are summarized in Table 2.

TABLE 2

| Example | Conductivity (mS/cm) | Type | Stability |
|---|---|---|---|
| 6 | 480 | o/w | >4 weeks |
| 7 | 472 | o/w | >4 weeks |
| 8 | 420 | o/w | >4 weeks |
| 9 | 3 | w/o | >4 weeks |

Example 10

Example of a w/o and w/o/w Multiple Emulsion
Step 1:
80 ml of a toluene are admixed with 1 g of a hydrophobic pyrogenic silica silylated with dimethylsiloxy groups and available under the name Wacker HDK H30 from Wacker-Chemie GmbH, prepared by silylating a pyrogenic silica of BET surface area of 300 m²/g, having a carbon content of 1.8% by weight and a surface silanol group content of 0.83 mmol/g (corresponding to a residual surface silanol group content of 51% relative to starting silica) and the mixture was then dispersed using an ultrasonicator (Sonics & Material, 20 kHz at 10 W) for 2 minutes. Then 20 ml of DI water are added and emulsification is carried out using an Ultra-Turrax rotor-stator homogenizer (1.8 cm diameter) at 13,000 rpm for 2 minutes, providing a stable w/o emulsion.

Step 2
Preparing a w/o/w Multiple Emulsion:
80 ml of DI water are mixed with 1 g of a silica obtained in accordance with Example 2 and dispersion is then carried out using an ultrasonicator (Sonics & Material, 20 kHz at 10 W) for 2 minutes. Then 20 ml of the above-described w/o emulsion are added and emulsification is carried out using an Ultra-Turrax rotor-stator homogenizer (1.8 cm diameter) at 11,000 rpm for 10 seconds. This gives a w/o/w multiple emulsion which is stable against shearing and for more than 15 months and which shows no coalescence whatsoever.

| Droplet sizes by light scattering (Malvern MasterSizer MS20) | |
| --- | --- |
| internal (w) droplets in (o) | 0.9 μm |
| external (w/o) droplets in (w) | 28 μm |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. Partly hydrophobic fumed silica particles said partly hydrophobic fumed silica particles having a contact angle θ in air for water of less than 180°, a degree of coverage i of the surface of the silica with silylating agent residues, based on the total silica particle surface area, of 1%<τ<50%, a density of surface silanol groups SiOH ranging between a minimum of 0.9 and a maximum of 1.7 SiOH/nm² particle surface area, and having a carbon content of more than 0% and up to 2.0% by weight, and a methanol number of less than 30, said partly hydrophobic silica prepared by a process comprising silylating fumed silica particles prepared under anhydrous conditions, with at least one of I) and II)

I) an organosilane of the formula $$R^1{}_n SiX_{4-n}$$

where n is 1, 2 or 3

$R^1$ being a monovalent, optionally halogenated hydrocarbon radical having 1 to 24 carbon atoms, being identical or different at each occurrence, and being saturated, aromatic, monounsaturated, or polyunsaturated, X each independently being halogen, a nitrogen-containing radical, $OR^2$, $OCOR^2$, or $O(CH_2)_x OR^2$, $R^2$ being hydrogen or a monovalent hydrocarbon radical having 1 to 12 carbon atoms, and x being 1, 2 or 3;

II) an organosiloxane composed of units of the formula $$(R^1{}_3 SiO_{1/2}), \text{ and/or}$$

$$(R^1{}_2 SiO_{2/2}), \text{ and/or}$$

$$(R^1 SiO_{3/2})$$

where $R^1$ is as defined above, or mixtures thereof,
the number of these units in one organosiloxane being at least 2; and I and II being used in a total amount of from 0.015 mmol/g to 0.15 mmol/g per 100 m²/g of silica BET surface area measured by the BET method in accordance with DIN 66131 and 66132.

2. The particles of claim 1, wherein said silylating is performed with an organosiloxane composed of units of the formula (II)

$$(R^1{}_3 SiO_{1/2}), \text{ and/or}$$

$$(R^1{}_2 SiO_{2/2}), \text{ and/or}$$

$$(R^1 SiO_{3/2})$$

where $R^1$ is as defined above, or mixtures thereof,
the number of these units in one organosiloxane being at least 2; II being used in a total amount of from 0.015 mmol/g to 0.15 mmol/g per 100 m²/g of silica BET surface area measured by the BET method in accordance with DIN 66131 and 66132.

3. The particles of claim 1, wherein said silylating is performed with an organosilane of the formula $$R^1{}_n SiX_{4-n}$$

where n is 1, 2, or 3, or a mixture of these organosilanes, where $R^1$ is a $C_{1-24}$ hydrocarbon radical selected from the group consisting of alkyl radicals, alkenyl radicals, aryl radicals, and alkylaryl radicals, each $R^1$ being the same or different, X each independently being halogen, a nitrogen-containing radical, $OR^2$, $OCOR^2$, or $O(CH_2)_x OR^2$, $R^2$ being hydrogen or a monovalent hydrocarbon radical having 1 to 12 carbon atoms, and x being 1, 2 or 3.

4. The particles of claim 1, wherein said step of silylating is performed with a mixture of at least one organosilane of the formula $R^1{}_n SiX_{4-n}$ with an organosiloxane of the formula (II).

5. The particles of claim 3, wherein each $R^1$ individually is selected from the group consisting of methyl, ethyl, propyl, butyl, pentyl, hexyl, octyl, decyl, dodecyl, hexadecyl, octadecyl, phenyl, biphenyl, napthyl, benzyl, ethylpenyl, tolyl, and xylyl radicals.

6. The particles of claim 1, wherein said partly hydrophobic silica has a methanol number less than 20.

7. The particles of claim 1, wherein said partly hydrophobic silica has a carbon content of 0.1 to 0.5 weight percent per each 100 m²/g of surface area.

8. The composition of claim 3, wherein $R^1$ is independently selected from the group consisting of methyl, octyl, and vinyl.

9. The partly hydrophobic silica particles of claim 3, wherein at least one organosilane is selected from the group consisting of methyltrichlorosilane, dimethyldichlorosilane, trimethylchlorosilane, and hexamethyldisilazane.

10. The partly hydrophobic silica particles of claim 1, wherein the contact angle θ is between 100° and 0°.

11. The partly hydrophobic silica particles of claim 1, wherein the contact angle θ is between 90° and 0°.

12. The partly hydrophobic silica particles of claim 1, wherein the density of surface silanol groups is between 1.2 and 1.7 SiOH per nm$^2$ of particle surface.

13. The partly hydrophobic silica of claim 1, which is effective to stabilize water-in-oil and oil-in-water emulsions without also using an emulsifier.

* * * * *

UNITED STATES PATENT AND TRADEMARK OFFICE
CERTIFICATE OF CORRECTION

| | | |
|---|---|---|
| PATENT NO. | : 8,333,946 B2 | Page 1 of 1 |
| APPLICATION NO. | : 10/738543 | |
| DATED | : December 18, 2012 | |
| INVENTOR(S) | : Torsten Gottschalk-Gaudig et al. | |

It is certified that error appears in the above-identified patent and that said Letters Patent is hereby corrected as shown below:

In the Claims:

Column 13, Line 54, Claim 1:

After "a degree of coverage" delete "i"
And insert -- $\tau$ --.

Column 14, Line 46, Claim 3:

After "a nitrogen" delete "containing".

Signed and Sealed this
Sixteenth Day of July, 2013

Teresa Stanek Rea
*Acting Director of the United States Patent and Trademark Office*